United States Patent [19]
Ooyagi et al.

[11] Patent Number: 5,820,954
[45] Date of Patent: Oct. 13, 1998

[54] STEEL STRIP FOR THREE-PIECE CAN BODY, PRODUCTION PROCESS THEREOF AND RESISTANCE SEAM WELDED THREE-PIECE CAN BODY

[75] Inventors: Yashichi Ooyagi; Tomohiko Hayashi, both of Futtsu; Mitsutoshi Inoue, Kitakyusyu; Michiyuki Kakimoto; Ryuichi Eguchi, both of Shimizu, all of Japan

[73] Assignees: Nippon Steel Corporation; Daiwa Can Company, both of Tokyo, Japan

[21] Appl. No.: 463,465

[22] Filed: Jun. 5, 1995

Related U.S. Application Data

[62] Division of Ser. No. 346,982, Nov. 30, 1994, which is a continuation of Ser. No. 883,357, May 15, 1992, abandoned.

[30] Foreign Application Priority Data

| May 17, 1991 | [JP] | Japan | 3-113494 |
|---|---|---|---|
| May 17, 1991 | [JP] | Japan | 3-113495 |
| May 17, 1991 | [JP] | Japan | 3-113496 |
| May 17, 1991 | [JP] | Japan | 3-113497 |
| May 17, 1991 | [JP] | Japan | 3-113498 |
| May 17, 1991 | [JP] | Japan | 3-113499 |
| Jun. 6, 1991 | [JP] | Japan | 3-135192 |
| Jul. 3, 1991 | [JP] | Japan | 3-162790 |
| Nov. 26, 1991 | [JP] | Japan | 3-311120 |

[51] Int. Cl.$^6$ ................................................. B29D 22/00
[52] U.S. Cl. .......................................................... 428/35.7
[58] Field of Search ................................ 428/35.7, 35.8, 428/35.9, 35.91, 37, 480, 458, 461, 416, 414, 418, 423.3, 423.7, 424.4, 520

[56] References Cited

U.S. PATENT DOCUMENTS

| 2,174,071 | 9/1939 | Grupe | 91/68.2 |
|---|---|---|---|
| 4,143,790 | 3/1979 | Ueno et al. | 220/458 |
| 4,741,934 | 5/1988 | Terayama et al. | 428/35.9 |
| 4,849,293 | 7/1989 | Koga et al. | 428/447 |
| 4,945,008 | 7/1990 | Heyes et al. | 428/623 |
| 4,957,820 | 9/1990 | Heyes et al. | 428/623 |
| 5,093,208 | 3/1992 | Heyes et al. | 428/623 |

FOREIGN PATENT DOCUMENTS

| 491107 | 2/1976 | Australia . |
|---|---|---|
| 0 312 303 | 4/1989 | European Pat. Off. . |
| 0 312 304 | 4/1989 | European Pat. Off. . |

OTHER PUBLICATIONS

European Search Report EP 92 30 4458, 1992.

*Primary Examiner*—S. Mark Clardy
*Assistant Examiner*—Michael A. Williamson
*Attorney, Agent, or Firm*—Kenyon & Kenyon

[57] ABSTRACT

A coiled steel strip for the manufacture of a three-piece can body having, on one surface corresponding to the outer surface of the can body, a multiple-layer organic film including a thermoplastic resin layer and a layer of inks arranged on said thermoplastic resin layer to represent a label of a content to be filled in the can, and on the other surface corresponding to the inner surface of the can body, a film or films of a thermosetting coating and/or a thermoplastic resin, said multiple layer organic film extending continuously along the length direction of said strip in a plurality of stripes, each having a width slightly smaller than the circumferential length of the can body and being arranged such that said strip has spaces of a width of 1 to 10 mm at both sides of each such stripe, free from coverage by said organic film, and said film or films of a thermosetting coating and/or a thermoplastic resin extending continuously along the length direction of said strip in a plurality of stripes, each having a width slightly smaller than the circumferential length of the can body and being arranged in alignment with said stripe of said multiple layer organic film back to back on the respective surfaces of said strip, as well as the production of the steel strip sheet, and a resistance seam welded three-piece can body.

4 Claims, No Drawings

STEEL STRIP FOR THREE-PIECE CAN BODY, PRODUCTION PROCESS THEREOF AND RESISTANCE SEAM WELDED THREE-PIECE CAN BODY

This is a division of application Ser. No. 08/346,982 filed on Nov. 30, 1994 which is a continuation of application Ser. No. 07/883,357 file May 15, 1992 (now abandoned).

BACKGROUND OF THE INVENTION

1. Field of the Invention

The present invention relates to steel strips for cans, and especially three-piece can bodies wherein the can bodies are produced by slitting can body blanks from steel strips having stripe-like multi-layer organic laminated films continuous in the length direction of the steel strips, followed by rolling and welding the can body blanks. The present invention also relates to a method of producing the steel strips for three-piece can bodies, and further, relates to resistance seam welded three-piece can bodies having a multi-layer organic film on the surface thereof.

2. Description of the Related Art

Seen from the viewpoint of the can manufacturing process, cans can be broadly classified into two types, normally a two-piece can where the can bottom and the can body are formed as an integral part and a can lid is fitted onto this part, typical examples of such can being DI can bodies (i.e., drawn and ironed can bodies) manufactured by a drawing • ironing process and DrD cans (i.e., drawn and redrawn can bodies) manufactured by a drawing process. The other type is a three-piece can, where a can bottom and a can top are fitted onto a body part, and typical cans of this type include soldered cans, bonded cans and welded cans, but at the present time, the bonded cans and welded cans are more important.

Tin-plated, nickel-plated, chromium-plated steel strips as well as other metal strips can be used as the materials for three-piece can bodies. In most cases, the inner surface of the can body is formed by coating these materials with an organic coating (or a thermosetting coating) from the viewpoint of the storage properties of the contents (i.e., corrosion resistance), and the outer surface of the can body is printed with a label representing a content to be filled in the can.

The inner surface coating and outer surface printing are achieved by cutting the sheet-like steel material and then using three passes on a cut sheet coating line, a first pass for an inner surface coating, a second pass for an outer surface base coating and a third pass for an outer surface printing. Where a high degree of resistance to corrosion is required, the inner surface coating is carried out twice, and when a multi-color printing with five or more colors is used, the outer surface printing is carried out by printing twice, and consequently, the coating and printing of the inner and outer surfaces of the can body is carried out using four sheet passes or five sheet passes. It is necessary to heat the cut sheet in a baking oven at each pass.

Although the printing is desired to be effected continuously with the inner surface coating and the outer surface base coating by a coil coating method, it is difficult to achieve this continuous printing economically and accuracy.

The technique of laminating film onto a steel strip is old and has been well investigated in the past in the field of cans. For example, as shown in Japanese Unexamined Patent Publication (Kokai) Nos. 62-227642 and 58-82717, the conventional technique has been applied principally to 5 gallon cans and two-piece can body known as DrD can body and DI can body, and to can lids, but there are no examples of the use of coil steel strips for three-piece can bodies having a bonded film on which an image of a label representing a content to be filled in the can has been printed as in the present invention.

As mentioned above, the three-piece can bodies used at present are manufactured via a complicated coating and printing process, and the three-piece can body is essentially costly because of disadvantages such as (1) poor productivity, (2) long time required, (3) a large number of worker required, and (4) difficulty in improving the external appearance of the print finish, and these are factors which reduce competitiveness of the three-piece cans. Moreover, there is a demand in the market for a beautiful printed appearance with a high class image label, and a further improvement of the print quality on the outer surface of the can body is required.

SUMMARY OF THE INVENTION

Accordingly, the objects of the present invention are to eliminate the above-mentioned disadvantages of the conventional three-piece can bodies and to provide a steel strip for three-piece can bodies by which the coated steel strip for three-piece can bodies can be produced and supplied in the form of a coil, whereby the corrosion resistance of the inner surface of the can is further increased, the decorativeness of the outer surface of the can bodies is greatly increased, and the product quality image is further improved.

Another object of the present invention is to provide a method of manufacturing a steel strip for a three-piece can body, which strip has a great flexibility and an excellent product quality and productivity, whereby the above-mentioned disadvantages are resolved by bonding a printing film on a steel strip continuously in a coil form with optional coating of the inner and/or outer surface thereof.

A further object of the present invention is to provide a three-piece can body by which the conventional complicated coating and printing process is completely modified, by which a continuous production of a steel strip having the desired coating and printed film is possible with a single sheet pass in the form of a coil, and which is more decorative and has a high quality image having a printed appearance which is more brilliant and has more depth, when compared with conventional three-piece can bodies, with no or a very little solvent-based paint being used.

Other objects and advantages of the present invention will be apparent from the following description.

In accordance with the present invention, there is provided a coiled steel strip for the manufacture of a three-piece can body having, on one surface corresponding to the outer surface of the can body, a multiple-layer organic film including a thermoplastic resin layer and a layer of inks arranged on said thermoplastic resin layer to represent a label of a content to be filled in the can, and on the other surface corresponding to the inner surface of the can body, a film or films of a thermosetting coating and/or a thermoplastic resin, said multiple layer organic film extending continuously along the length direction of said strip in a plurality of stripes, each having a width slightly smaller than the circumferential length of the can body and being arranged such that said strip has spaces of a width of 1 to 10 mm at both sides of each such stripe, free from coverage by said organic film, and said film or films of a thermosetting coating and/or a thermoplastic resin extending continuously along the length direction of said strip in a plurality of stripes, each having a width slightly smaller than the circumferential length of the can body and being arranged in alignment with said stripes of said multiple layer organic film back to back on the respective surfaces of said strip.

In accordance with the present invention, there is also provided a method of producing a coiled steel strip for the manufacture of a three-piece can body having a printed thermoplastic resin film on one of the surfaces of said strip by continuous lamination of said printed thermoplastic resin film, while said strip is being unwound and dispensed from an uncoiler, directly to the surface of said strip or to an organic film of a thermosetting coating applied to the surface of said strip in a plurality of stripes extending continuously along the length direction of said strip, each stripe having a width slightly smaller than the circumferential length of the can body and being spaced from adjacent stripes, comprising the steps of preparing a roll of a printed thermoplastic resin film having a plurality of stripes of printed portions carrying a layer of inks to represent repetitive images of a label to be provided on the can body, said stripes of printed portions being spaced for one another with a print free portion provided therebetween, slitting said printed film prior to lamination into a plurality of stripes each having a width slightly smaller than the circumferential length of the can body for removing said print free portions, and bonding said printed portions to said strip while removing said print free portions from said printed film.

In accordance with the present invention, there is further provided a method of producing a coiled steel strip for the manufacture of a three-piece can body having a printed thermoplastic resin film on one of the surfaces and another thermoplastic resin film on the other surface of the said strip by continuous lamination of said printed thermoplastic resin film, while said strip is being unwound and dispensed from an uncoiler, directly to the surface of said strip or to an organic film of a thermosetting coating applied to the surface of said strip in the plurality of stripes extending continuously along the length direction of said strip, each stripe having a width slightly smaller than the circumferential length of the can body and being spaced from adjacent stripes, and by continuous lamination of said another thermoplastic resin film on said other surface of said strip, while said strip is being unwound and dispensed from an uncoiler, directly to said other surface or to an organic film of a thermosetting coating applied to said other surface of said strip in a plurality of stripes extending continuously along the length direction of said strip, each stripe having a width slightly smaller than the circumferential length of the can body and being spaced from adjacent stripes, comprising the steps of preparing a roll of a printed thermoplastic resin film having a plurality of stripes of printed portions carrying a layer of inks to represent repetitive images of a label to be provided on the can body, said stripes of printed portions being spaced one from another with a print free portion therebetween, slitting said printed film prior to lamination into a plurality of stripes each having a width slightly smaller than the circumferential length of the can body for removing said print free portions, bonding said printed portions to said one surface of said strip while removing said print free portions from said printed film, slitting a roll of another thermoplastic resin film prior to lamination into a plurality of stripes each having a width slightly smaller than the circumferential length of the can body, with a space 1 to 10 mm in width provided between each adjacent stripe, and bonding said stripes of said another thermoplastic resin film to said other surface of said strip while removing the portions between said stripes thereof, in such manner that said stripes of said another thermoplastic resin film and said printed portions of said printed thermoplastic resin film are arranged in alignment and back to back on respective surfaces of said strip. According to this method, the continuous laminations of the printed thermoplastic resin film and said another thermoplastic resin film may be carried out in any order or simultaneously.

In accordance with the present invention, there is still further provided a resistance seam welded three-piece can body having, on its outer surface, a multiple layer organic film of a structure of (1) an organic coating layer/an adhesive layer/a printing ink layer/a thermoplastic resin layer/a clear organic coating layer containing a lubricant, (2) an adhesive layer/a printing ink layer/a thermoplastic resin layer/a clear organic coating layer containing a lubricant, (3) an organic coating layer/an adhesive layer/a thermoplastic resin layer/a printing ink layer/a clear organic coating layer containing a lubricant or (4) an adhesive layer/a thermoplastic resin layer/a printing ink layer/a clear organic coating layer containing a lubricant, all being arranged one on top of another in said order on said surface of the can body, and having, on its inner surface, (1) a thermosetting organic coating layer, (2) an adhesive layer/thermoplastic resin layer being arranged one on top of the other in said order on said inner surface, or (3) a thermoplastic resin layer.

In accordance with the present invention, there is still further provided a resistance seam welded three-piece can body having, on its outer surface, an adhesive layer/a thermoplastic resin layer containing a white pigment/a printing ink layer/a clear organic coating layer containing a lubricant, all being arranged one on top of another in said order on said outer surface, and having, on its inner surface, (1) a thermosetting organic coating, (2) an adhesive layer/a thermoplastic resin layer being arranged one on top of the other in said order on said inner surface or (3) a thermoplastic resin layer.

DESCRIPTION OF THE PREFERRED EMBODIMENTS

The fundamental concept of the present invention is to print continuously on a film, since it is difficult to print directly and continuously on a steel strip, and to bond the printed film continuously onto the surface of a steel strip.

A manufacturing process for a three-piece can and canning process involves coating organic films for the inner can surface and the outer can surface onto the both surfaces of a surface treated steel strip, cutting the resultant steel strip to can body blanks having a size corresponding to the desired can size, rolling each body blank into a cylinder, joining both edges of each body blank to form a side seam by welding, and carrying out a repair coating of the welded part i.e. the side seam, a necking-in process, and fitting the can bottom to form a can body, and a known canning process involves filling the contents and fitting the top lid, and a high temperature sterilization treatment (i.e., retort treatment) is carried out after filling the contents.

In the present invention, an uncoated and lamination free parts having a width of 1–10 mm, preferably 2 to 4 mm, is significant for cutting the steel strip to the corresponding can size in the center of the uncoated and lamination free parts size so as to prepare a welding lap (i.e., overlapping part) during the can body production. The welding lap during the can body production is about 0.5 mm.

Since the bonded laminate film must not be affected by heat generated during the production of a can body by welding, an uncoated part/or a film non-bonded part having a width sufficient not to be adversely affected by the heat should remain at the both end of each can body blank. For this reason, the width of the uncoated part is 1–10 mm, preferably, 2–4 mm.

The can body blank must have uncoated and lamination free parts at the both edges thereof. The width of the can body blank depends upon the can size taking into consideration the welding lap.

When a steel strip of the type having uncoated and lamination free parts at both edges is manufactured in a film laminating system, in general a method wherein the steel strip is slit into strips of the required width and a film of a width narrower than the width of the pre-prepared steel strip is laminated over the cut strip, leaving the uncoated and lamination free two edges of the steel strip, has been adopted, but although this method provides a technically precise method of manufacture, it is necessary to pre-cut the steel strip and the film to the required size, and the method is inadequate in terms of productivity since the production takes place strip by strip.

In the present invention, the steel strip is not pre-slit into the form of stripes and it is possible to replace a printing process by bonding the printed films in the form of stripes, with an excellent productivity, over the whole surface in the width direction.

The role of each of the layers from which the films according to the present invention are constructed is described below.

The resin film on the outer surface of the can body forms the basis for the continuous printing as mentioned before. A multiple-layer film which has a multi-layer structure comprising an adhesive layer/printing ink layer/thermoplastic resin layer/clear organic coating layer containing a lubricant, or an adhesive layer/thermoplastic resin layer/printing ink layer/clear organic coating layer containing a lubricant is prepared and laminated onto the surface of the steel strip.

Among the structural layers of this multiple-layer film, the printing ink layer is the layer indicating the brand, etc., and is printed with the trademark and the other designs. The clear organic coating layer containing a lubricant (i.e., lubricating layer) is intended to prevent the multiple-layer film from being damaged at the high speed can production line, and is essential from the point of view of ensuring the external appearance such as the brilliance, etc. The adhesive layer is required so that the pre-printed printing ink layer can be laminated with an adequate adhesion strength.

There are cases where a thermosetting resin layer is used as a base coat for promoting adhesion or ensuring the brilliance of the appearance of the printing of the multiple-layer film used on the outer surface of the can body.

The film or coating for the inner surface of the can body is intended to provide good storage properties for the contents (i.e., corrosion resistance), and as mentioned earlier, there are cases where a double inner surface coating is required for applications where a high degree of corrosion resistance is required, but with the film lamination method, all applications are possible by varying the thickness of film and the type of resins.

The multiple-layer organic films usable in the present invention are described below.

The manufacturing process for a three-piece can body has been outlined, but the repair coating of the side seam part of the can body is essential in the case of a welded can body in particular and various repair coatings are carried out depending on the contents to be filled in the can. The repair coating is directed towards a short baking period at a high temperature, from the viewpoint of productivity, and the baking temperature is 150° C. or more, and sometimes the temperature reaches 280° C. Furthermore, a retort treatment is generally carried out for 20–60 minutes at a temperature of 110°–130° C. Hence, the films laminated onto the inner and outer surfaces of the can body must be able to withstand these processes, and is especially limited from the viewpoints of heat resistance and water resistance.

The films usable in the present invention are thermoplastic films such as polyester resin films, polypropylene resin films and nylon resin films and the like. The principal purpose of the laminated film for the inner surface is to ensure a corrosion resistance in respect of the contents, but if it does not have a sufficient heat resistance, when the repair coating is being baked, there are cases where it may melt locally, and to such an extent that defects are generated, the coating performance is impaired, and the corrosion resistance becomes very poor. Hence it is essential to use a film appropriate for the baking conditions of the repair coating of the side seam part mentioned above.

In the case of a polypropylene resin film, the melting point is about 165° C., and therefore, the polypropylene resin film can be advantageously used where the baking temperature for the repair coating is 160° C. or less. In the case of a nylon resin film, the melting point is about 225° C., and therefore, the nylon resin film can be advantageously used where the baking temperature for the repair coating is 220° C. or less. In the case of a polyester resin film, a high melting point of 265° C. can be obtained by selecting an alcohol component and an acid component, and therefore, the polyester resin film is generally useful and desirable since it can also ensure the heat resistance.

The polyester resin film of stretched and oriented crystalline structure is preferable from the viewpoint of heat resistance and processability in the can manufacturing process and appearance of the product, and therefore a uniaxially oriented or biaxially oriented film is preferably used.

The multiple-layer film made as mentioned above is laminated onto the steel strip surface via an adhesive layer. Polyester based, epoxy based or urethane based adhesives containing a hardening agent can be used for the adhesive, but the coating and drying operation of the adhesive is carried out in general using a roll coater, and this is not preferable for high speed lines above 200 m/min. Thus, a higher productivity is secured by making a double layer structure film comprised of a lower layer of low melting point saturated polyester resin and an upper layer of a high melting point saturated polyester resin having a melting point of at least 10° C. higher than that of the above-mentioned adhesive layer at the production stage of the double layer structure film. A thermal lamination at high speed is possible by melting only the lower low melting point layer and leaving the upper high melting point layer with an oriented crystalline structure. At this time, the white pigment may be added to only the upper layer or to both the upper layer and the lower layer.

In the case of a polyester resin film, films can be obtained ranging from those having a high melting point of about 260° C. to those having a melting point below 200° C., with an appropriate selection (e.g., copolymerization) of the alcohol component and the acid component, and these materials can be formed into films by a double layer co-extrusion using T-dies and a subsequent orientation process.

Regarding the water resistance, the use of a resin film which has, for example, a water uptake of 1% or less is desirable. If a film having a water uptake of more than 1% is used, corrosion of the underlying steel strip is liable to occur during the above-mentioned retort treatment, and since this may lead to denaturation of the contents, it is undesirable. Polyester resin films, polypropylene resin films and polyethylene resin films do not have any problems because the water uptake thereof is less than 1%, but when a nylon resin film is used, it is preferable to avoid the use of films of, for example, nylon 6.

The thickness of the film for the inner surface of the can body according to the present invention is generally 5–50 $\mu$m. The reasons for limiting the film thickness to 5–50 $\mu$m are as follows. Namely, with a thickness of less than 5 $\mu$m film, damage of the film can be anticipated in the can manufacturing process and this is inadequate for ensuring a satisfactory storage of the contents. On the other hand, if the thickness becomes more than 50 $\mu$m, the effect in terms of corrosion resistance is saturated and this is economically impractical. Accordingly, the inner surface laminated film thickness is preferably within the range of 12–40 $\mu$m, most preferably 16–30 $\mu$m.

A film thickness of 5–25 $\mu$m is used for the film on the outer surface of the can body. When the thickness is below the lower limit of 5 $\mu$m, rust spots will occur when the film is damaged in the can manufacturing process, and the appearance will unpreferably deteriorate. On the other hand, when the upper limit of 25 $\mu$m is exceeded, the effect in respect of the prevention of rust formation is saturated and there is a disadvantage from the economical viewpoint. The preferred range is 8–20 $\mu$m.

Thermal bonding methods and adhesive coating methods can be used for the film bonding to the surfaces of the steel strip in the present invention. Since polyester resin films and nylon resin films are thermally bondable resins per se, a direct thermal bonding to the surface of a heated steel strip is usable. In the case of polypropylene films and polyethylene films, however since they are not thermally bondable, they are modified with, for example, maleic acid or maleic anhydride, as long as there is no problem in terms of foodstuffs hygiene, and are rendered thermally bondable.

As an adhesive coating means, a polyester based or urethane based adhesive containing a hardening agent can be used for coating, followed by drying. The thickness of the adhesive layer is generally 1–5 $\mu$m. When the thickness is less than 1 $\mu$m, a satisfactory adhesive strength is not ensured. Furthermore, when the thickness is more than 5 $\mu$m, the effect is saturated. The preferable thickness is 1.5–4 $\mu$m.

Furthermore, when an organic film is used on the inner surface of the can body, those which are used as coatings for the inner surfaces of conventional can bodies, for example, epoxy based (e.g., epoxy phenol based, epoxy ester based, epoxy urea based), acrylic based and polyester based coatings, can be applied to the surface of the steel strip, which corresponds to the inner surface of the can body. The amount coated is sufficient at 5–10 $\mu$m as a dry film thickness, and the conventional roll coating methods, etc., can be adopted for the coating method.

When a thermosetting organic coating film is used as a base coat for the film laminated on the outer surface of the can body, an epoxy based, acrylic based or polyester based coating and the like can be applied to the surface of the steel strip, which corresponds to the outer surface of the can body, and 0–30% of a titanium oxide based white pigment may be included. The lower limit of 0% signifies a case in which no pigment is added, but where a white pigment is added, the whitening effect is slight with less than 1%, and the whitening effect is more or less saturated with more than 30%, and the properties of the coated film become poor, and so less than 30% is preferable. The most preferable range is 10–25%.

The thickness of the thermosetting organic film layer is generally 1–15 $\mu$m, but when no white pigment is included, the thickness of the thermosetting organic film layer is preferably 1–3 $\mu$m, and when coloring with a white pigment is anticipated, the thermosetting organic film thickness is preferably 5–15 $\mu$m.

The lubricating film layer and the printing ink layer of the outer surface of the can body are now described below.

The lubricating film lager, which is the outermost layer of the multiple-layer film, is used to prevent the multiple-layer film from being damaged in the can manufacturing process and to facilitate the sheet passing properties during the can manufacturing process. A film having a static friction coefficient of not more than 0.2 can be advantageously used. For example, films having fine Si based particles or an organic based lubricant included in a coating, such as an acrylic based or polyester based coating can be used. The thickness is generally 0.1–5 $\mu$m. When the thickness is less than 0.1 $\mu$m the friction coefficient cannot be reduced, and therefore, no effect is observed. When the thickness is more than 5 $\mu$m, there is no further reduction of the friction coefficient and the effect is therefore saturated. The thickness of the uppermost lubricating film layer is preferably 1–4 $\mu$m.

The printing ink layer to be used in the present invention is for printing the image of a label of a content to be filled in the can, and is printed with inks having a good heat resistance and retort resistance in which, for example, a urethane resin is used as the main binder. Gravure printing is desirable for ensuring the brilliance of the image of the label of the content, which is an important object of the present invention. The thickness of the printing ink layer varies according to the image of the label of the content, and fundamentally cannot be limited.

The multiple-layer organic film can be laminated on the surface of the steel strip corresponding to the outer surface of the can body according to the present invention by, for example, dry lamination methods, in which the film having the lubricating film layer and the printing of the image of a label of a content thereon is laminated onto a steel strip having an adhesive layer coated thereon. Alternatively methods, in which a multiple-layer organic film obtained by first coating a lubricating film layer on a printing ink layer film and then coating an adhesive onto the printing ink layer side surface, followed by drying, is laminated onto a heated steel strip. The steel strip having multi-layer film thus obtained can be used to manufacture the usual three-piece can body such as welded cans.

The means of laminating the multiple-layer organic film to the surfaces of the steel strip corresponding to the inner and outer surfaces of the can body according to the present invention are those as described above for the inner surface and the outer surface respectively, but the dimensional accuracy and the form of the laminated films are important such that the lamination free parts of one surface side of the steel strip are arranged in alignment with the lamination free parts or the uncoated parts on the other surface side of the steel strip back to back on the respective surfaces.

Heating systems involving, for example, the passage of electricity, high frequency induction heating systems, hot draught heating systems and infrared heating systems can be used, alone or in combination, as a means of heating the steel strip.

The steel strips usable in the present invention are surface treated steel strips plated with, for example, Al, Cr, Ni, Sn and a sheet having a thickness of 0.10–0.25 mm is often used. More practically, tin-plated steel strips subjected to a chemical treatment after tin plating with 0.5–3.0 g/m$^2$ of tin, nickel plated steel strips subjected to a chemical treatment after nickel plating with 0.3–2.0 g/m$^2$ of nickel, Sn/Ni plated steel strips subjected to a chemical treatment after plating sequentially with Ni and Sn with 0.1–0.5 g/m$^2$ of Ni, and 0.5–2.0 g/m$^2$ of Sn, and chrome-chromate treated steel strips generally known as TFS (i.e., tin free steel) having 50–120 mg/m$^2$ of metallic chromium and 5–20 mg/m$^2$ of Cr oxide.

Preferably, a surface treated steel strip having a mirror-gloss surface of at least 300% at the specular gloss 60° is used in the present invention.

Normally, the hue of a metal is determined fundamentally by the spectral reflectance of the metal itself and, for example, the whiteness is seen to become whiter as the spectral reflectance in the wavelength range of 400–700 nm increases. Moreover, in the case of the same metal, more whiteness is seen as a result of diffuse reflection as the surface roughness increases, and a sample with a low surface roughness appears darker because of the high regular reflectance. This is the same for surface treated steel strips for which a plating, for example, has been carried out on the steel strip surface.

Nevertheless, it was clear from the results of an investigation by the inventors that the whiteness of the white ink parts when a printing ink layer had been laminated and the whiteness where a layer to which white pigment had been added had been laminated, as in the present invention, was seen to become whiter as the surface roughness became smaller and the gloss became higher, the reverse of the effect of the surface roughness, and moreover, that the white parts became whiter as a result of the contrast between the white parts and the colored parts in the printed design and the printed design shone. The present invention is based upon the above mentioned finding.

A surface treated steel strip having a gloss in all directions of surface, which is a mirror-gloss of at least 300% at the specular gloss 60° is used in the present invention.

With a gloss in all directions of surface of less than 300% at the specular gloss 60°, the whiteness does not appear satisfactory and this is undesirable. Where the amount of white ink attached is small, in particular, and where little white pigment is included in the film, the hue of the steel strip which has been laminated and the effect of the hue of the film itself are very apparent. The surface gloss is preferably above 350%, and most preferably is at least 400%, measured by specular gloss 60°.

Furthermore, the reasons for limiting to the surface gloss in all directions of surface to at least 300% at the specular gloss 60° will be described.

In general, the gloss in the cross direction of a steel strip coil is poor compared to the gloss in the length direction of the coil. To a certain extent this cannot be avoided even with a steel strip which has been surface treated while the surface form, thickness precision and dimensional accuracy, etc., of the steel strip coil have been achieved by rolling. Nevertheless, the difference in the gloss in the surface direction of the surface has little effect on the color condition when a film has been laminated as in the present invention. Hence, it is necessary to ensure that the gloss in all directions of surface is above a certain standard, and in this sense the above limitation is imposed for all surface directions.

In connection with "above 300% at the specular gloss 60°" as used in the present invention, the sample is measured, after standardizing a gloss-standard of gloss 92.0, for example, as 9.20, with a digital glossimeter (cassette type) made by Suga Shikenki K. K. or a Minolta glossimeter GM-060, for example, and the numerical value multiplied by 10 is taken as the gloss value.

The method of manufacturing the steel strip for a three-piece can body of the present invention is described in detail below.

First, the surface treated steel strip to be used in the present invention is supplied as a coil product, and after coating in the form of stripes in the predetermined position for the laminated film with a thermosetting coating and baking, as required, the temperature is adjusted by heating or cooling to the temperature required for film lamination. The heating system may be hot draught heating or radiant heating for example, but from the viewpoint of temperature control, electrical heating or induction heating are preferred, and the sheet is heated to a temperature of from 100°–250° C. according to the bonding system.

The procedure for laminating the film on the surface of the steel strip which has reached the prescribed temperature involves unwinding the wide film having stripe-like printed parts at the same speed as the strip passing speed, slitting the film into a plurality of stripes immediately before the press bonding part, press bonding only the printed parts of the film, which has been slitted into printed parts and unprinted parts, onto the steel strip, and removing the unprinted parts from the system before press bonding onto the steel strip. At this time, by carrying out the slitting and press bonding of the film with very close positional relationship (immediately before the press bonding rolls), it is possible to laminate while maintaining the positional relationship of the printed part of the film before slitting, and it is possible to ensure the accuracy of the position to be laminated. With this method, parts with no film on the surface of the steel strip of the same width as the print free parts of the film are ensured, and it is possible to ensure the weldability required to form a three-piece can body.

Mechanical slitting methods are generally employed as a means of slitting films, but slitting methods using lasers are preferred since changes in size can be achieved with a remote operation, and because they have a semi-permanent life expectancy.

The method of manufacturing the stripe laminated steel strip of the present invention is used in various forms, combining the conventional coatings. For example, there are methods in which the printed film is laminated only on the surface of the steel strip corresponding to the can outer surface after coating a thermosetting resin coating on both surfaces corresponding to the can inner and outer surfaces, methods in which a thermosetting resin coating is coated in the form of stripes on the surface of the steel strip corresponding to the can inner surface and the printed film is laminated directly onto the other surface of the steel strip corresponding to the can outer surface, and methods in which a film for the inner surface of the can body is laminated onto the surface of the steel strip corresponding to the can inner surface and a printed film is laminated onto the other surface of the steel strip corresponding to the can outer surface, etc.

The procedure for laminating the film on the surface of the steel strip which has reached the prescribed temperature involves unwinding the wide film having stripe-like printed parts at the same speed as the strip passing speed, and laminating this on the whole surface of the steel strip. At this time, where a thermosetting resin coating, etc. has been pre-coated in the form of stripes on the surface of the steel strip, the stripe-like printed parts of the film must be located precisely in such a way as to be superimposed over the strip-like thermosetting resin coating. Furthermore, it is necessary to maintain the length accuracy during lamination in such a way that no stretching or shrinkage occurs.

There are parts on the printed film laminated over the whole surface of the steel strip which are not coated with adhesive (print free parts of a width of 4 mm in the example described earlier), and slits must be introduced at the boundary lines between the printed parts and the print free parts so that these parts can be removed. At this time, care must be taken so that flaws are not introduced onto the surface of the steel strip, and a control of the slitting depth is important. In this sense, burning only the film with a quantity of heat by which the underlying metal is unaffected, using laser beams, is effective. Furthermore, it is important that the adhesive must be cured when the print free parts are removed by slitting.

Only the print free parts (the parts not coated with an adhesive to a width of 4 mm in the example described earlier) of the laminated film layer in which the slits have been made are continuously peeled off and removed. The removing operation can be achieved by continuously peeling off and removing the print free parts in the form of ribbons with a weak tension if a control of the slitting depth is carried out skillfully.

The control of the slitting depth is a fairly precise technique in a high speed operation, and the introduction of perforations beforehand into the printed film effectively assists the peeling operation.

There is no residual material on the surface of the steel strip after the print free parts have been peeled off in this way, and after the strip has been slit along the center lines and cut into can body blanks, these parts can be used for the weld parts without difficulty.

The method of manufacturing the stripe-like laminated steel strip of the present invention can be used in various embodiments in combination with a conventional coating. For example, there are methods in which a printed film is laminated on the surface of the steel strip corresponding to the can outer surface only after coating a thermosetting resin coating on both surfaces of the steel strip corresponding to the can inner and outer surfaces, methods in which a thermosetting resin coating is coated in the form of stripes on the surface of the steel strip corresponding to the can inner surface and the printed film is laminated directly onto the surface of the steel strip corresponding to the can outer surface, and methods in which a film for the can inner surface is laminated onto the surface of the steel strip corresponding to the can inner surface and the printed film is laminated onto the other surface corresponding to the can outer surface, etc.

The present invention provides many advantages in that the continuous coating and bonding of the multiple-layer film having a print can be carried out on a high speed line using a wide coil, and a productivity of at least double that of a conventional strip coating line can be obtained. Also, the time taken is shortened because there is no need for a plurality of line passes. The use of a coil product is also advantageous in that there are no major handling problems even when the steel strip material is made very thin. A higher quality print appearance due to gravure printing and a saving of man powers due to the simplified process can be achieved, and the problems in the conventional coating and printing process for steel strip for the manufacture of three-piece can bodies can be solved.

Furthermore, the present invention secures many advantages. Thus, by using a special multi-layer structure it is possible to carry out, at a high speed, the continuous coating and bonding process using coil products with a considerable width, and it is possible to ensure a productivity at least double that of a cut sheet coating line. A plurality of sheet line passes is not required and so the time required is shortened. There is also an advantage in that, by using a coil product, no major handling problems arise even when the thickness of the steel strip is made very thin, and the problems encountered in the conventional three-piece can steel strip coating and printing process can be resolved at a stroke. Furthermore, by using gravure printing it is possible to print with brilliance and depth when compared with the existing outer surface printed can bodies, and it is possible to supply three-piece cans corresponding to the diversification and upgrading of consumer tastes, and thus the social significance thereof is considerable.

EXAMPLES

The present invention will now be further illustrated by, but is by no means limited to, the following Examples.

Example 1

A coiled steel strip having a thickness of 0.20 mm and a width of 832 mm was plated on both sides with both 1.0 g/m$^2$ of tin and 0.3 g/m$^2$ of nickel and then chromate treated. Then, one side of this strip was coated continuously by a roll coater with five stripes of a 8 μm thick thermosetting epoxy ester coating containing a white pigment (a white coating), such that the five stripes, each extending along the length direction of the strip in a width of 162.00 mm and being spaced from one another by 3.8 mm, were arranged in the center of the width of the strip.

Subsequently, the coated strip was baked in a thermal oven to cure the coating, and when the strip was heated to 180° C., it was laminated continuously, on the other side, with a biaxially oriented 16 μm thick polyester film via a low melting point adhesive layer thereon, in five stripes each 162 mm in width, such that the respective stripes of the coating and the polyester film were arranged back to back in an aligned relationship on opposite sides of the strip. For the lamination of the five stripes of the polyester film, a wide roll of a polyester film was used and was slitted, just prior to lamination, to form the five stripes while leaving the above-mentioned spaces, and the five stripes of film were bonded to the strip while the remaining areas of the film were removed.

Then, this laminated strip was again heated to 200° C. and a biaxially oriented 12 μm thick polyester film having a 2 μm thick layer of thermosetting epoxy coating containing silicon lubricant on one side and a printed ink layer provided by a gravure printer on the other side in five stripes, each extending along the length direction of the film at a width of 162 mm and spaced apart by 3.8 mm, to represent repetitive images of a label of a product, and a layer thereon of an urethane based 2.5 μm thick adhesive was bonded to the coated surface of the strip in five stripes of the same width as, and over the whole surface of, the five stripes of the white coating.

For this lamination of the five stripes of the printed and coated film, a wide roll of a biaxially oriented 12 μm thick polyester film having the above-mentioned thermosetting epoxy coating containing silicon lubricant on one side and the above mentioned 5 stripes of a printed ink layer and adhesive layer on the other side was used and was slitted, just prior to lamination, into the five stripes leaving the above-mentioned spaces, and the five stripes of the slitted films were bonded to the strip, while the remaining areas of the film were removed. The strip was then quenched.

The strip with the stripes of the multiple layer organic films thus obtained was slitted into can body blanks to a width of 165.8 mm and a length of 136.2 mm in such manner that each such blank carried, on one side, a 162 mm wide stripe of a biaxially oriented 16 μm thick polyester film and, on the other side, a 162 mm wide stripe of a biaxially oriented 12 μm thick polyester film having an image of the label of the product with an uncoated and lamination free portion 1.9 mm in width provided at both edges of each stripe on the blank.

Each body blank was then rolled into cylinder 52.6 mm in diameter and welded at an overlap of both edges of the rolled blank by a resistance seam welding bodymaker to form a can body with the image of the label on its outside surface. Thereafter, both sides of the welded seam of the can bodies were repair coated with a thermosetting epoxy resin coating and the coated films were baked at 250° C. and cured. The can bodies obtained in this example had a good gloss on the outside surface, and the images of the label on the can bodies had less discoloration caused by heat for the baking and were sharper than those of a label printed directly on a square sheet strip used for conventional 3-piece cans. The above can bodies were subjected to further processes on a can manufacturing line and were necked in, flanged and double seamed with bottom lids.

The can bodies double seamed at one end with the bottom lids were then filled with 1% salt water and closed with top lids to form filled cans. The filled cans were further subjected to retorting at 125° C. for 30 minutes and then inspected. In the inspection, no peeling off of any layer or adverse effect to the appearance and the sharpness of images of the label provided on the can bodies, as might be expected due to the retorting, was identified.

Similarly, no sign of corrosion was identified in the inside surfaces of the can bodies in the inspection. Furthermore, the re-inspection of the filled cans retorted and stored for a month at 38° C. revealed no identifiable corrosion problem.

Example 2

A coiled steel strip having a thickness of 0.20 mm and a width of 832 mm was plated on both sides with 0.53 g/m² of nickel and then chromate treated. Subsequently, the strip was heated to 180° C. and laminated continuously, on one side, with a biaxially oriented 25 μm thick polyester film via a low melting point adhesive layer thereon, in five stripes of each 162 mm in width, such that the five stripes, each extending along the length direction of the strip in a width 162 mm and spaced from one another by 3.8 mm were arranged in the center of the width of the strip.

For the lamination of the five stripes of the polyester film, a wide roll of a biaxially oriented 25 μm thick polyester film was used and was slitted, just prior to lamination, into the five stripes leaving the above-mentioned spaces, and the five stripes of the films were bonded to the strip while the remaining areas of the film were removed.

Then this laminated strip was again heated to 200° C. and a biaxially oriented 15 μm thick polyester film having, on one side, a layer of a 2 μm thick polyester coating containing minute Si based particles (lubricant) and having, on the other side, a printed ink layer provided by a gravure printer in five stripes, each extending along the length direction of the film in a width of 162 mm and being spaced apart by 3.8 mm, to represent repetitive images of a label of a product and an urethane based 1.5 μm thick adhesive layer thereon was bonded to the other side of the strip in five stripes, such that the five stripes of the 25 μm thick polyester film and the five stripes of the 15 μm thick polyester film were arranged in back to back alignment with each other on the respective sides of the strip. For this lamination of the five stripes of the printed film, a wide roll of a biaxially oriented 15 μm thick polyester film having the above mentioned layer of 2 μm thick polyester coating on one side and the above mentioned 5 stripes of a printed ink layer and 1.5 μm thick adhesive layer on the other side was used and was slitted, just prior to lamination, into the five stripes leaving the spaces, and the five stripes of the slitted films were bonded to the strip while the remaining areas of the film were removed. The strip was then quenched and dried.

The strip with the stripes of the multiple layer organic films thus obtained was slitted into can body blanks to a width of 165.8 mm and a length of 136.2 mm in such a manner that each such blank carried, on one side, a 162 mm wide stripe of a biaxially oriented 25 μm thick polyester film and, on the other side, a 162 mm wide stripe of a biaxially oriented 15 μm thick polyester film having an image of the label of the product with a lamination free portion 1.9 mm in width provided at both edges of each stripe on the blank.

Each body blank was then subjected to the can manufacturing processes as used in Example 1 and formed into a can body with the image of the label on its outside surface. The can bodies were then filled with a liquid coffee product and closed to form filled cans, which were further subjected to retorting at 120° C. for 15 minutes and then inspected. In the inspection, the can bodies obtained in this example had a good gloss on the outside surface, and the images of the label on the can bodies had less discoloration caused by heat for the baking and were sharper than those of a label printed directly on a square sheet strip used for conventional 3-piece cans. Also, no sign of corrosion was identified in the inside surfaces of the can bodies in the inspection, and furthermore, a re-inspection of the filled cans retorted and stored for a period of three months at 38° C. revealed no identifiable corrosion problem.

Example 3

The strip plated on both sides with both tin and nickel and then chromate treated as used in Example 1 was prepared for this example. This strip was coated continuously by a roll coater with five stripes of a 5 μm thick thermosetting epoxy coating on one side and five stripes of a 10 μm thick thermosetting epoxy ester coating containing a white pigment (a white coating) on the other side, such that the five stripes on the respective side of the strip, each extending along the length direction of the strip in a width of 162.00 mm and spaced from one another by 3.8 mm were arranged in the center of the width of the strip and aligned back to back with each other on opposite sides of the strip.

Subsequently, the coated strip was baked in a thermal oven to cure the coatings, heated to 180° C., laminated continuously, on the surface side carrying the stripes of the white coating, with the same polyester film having the adhesive layer, the ink layer and the thermosetting epoxy coating layer as used in Example 1, in five stripes of each 162 mm in width in the same manner as used in Example 1, such that the respective stripes of coating and the polyester film were arranged back to back in an aligned relationship on opposite sides of the strip. The strip with the stripes of the multiple layer organic films thus obtained was slitted into can body blanks in the same manner as described in Example 1 and subjected to the can manufacturing processes as used in Example 1 to form can bodies with the image of the label on their outside surfaces. The can bodies were then filled with a tomato juice product and closed to form filled cans, which were further subjected to retorting at 125° C. for 30 minutes and then inspected. In the inspection, the can bodies obtained in this example had a good gloss on the outside surface, and the images of the label on the can bodies had less discoloration caused by heat for the baking and were sharper than those of a label printed directly on a square sheet strip used for conventional 3-piece cans. Also, no sign of corrosion was identified in the inside surfaces of the can bodies in the inspection, and furthermore, a re-inspection of the filled cans retorted and stored for a period of three months at 38° C. revealed no identifiable corrosion problem.

Example 4

A biaxially oriented polyester film having a total thickness of 12 $\mu$m and a two-layer structure comprising a lower layer having a melting point of 190° C. and an upper layer having a melting point of 240° C. (wherein the upper layer contained 20% by weight of titanium oxide based white pigment) was manufactured, and then an image of a label of a content was gravure printed using a printing ink in which a polyurethane based resin was used for the binder, on the upper layer film surface and a printed multi-layer structure film was obtained by coating a polyester based clear coating containing fine Si based particles 2 $\mu$m in diameter over the printing.

Further, a biaxially oriented polyester double layer structure film having the same melting points as aforementioned, but not containing white pigment (lower layer 3 $\mu$m, upper layer 15 $\mu$m) was prepared as a film for the inner surface of a can body. A Sn/Ni plated steel sheet with 1.0 g/m$^2$ of Sn and 0.03 g/m$^2$ of Ni plated, followed by chromate treated, and having a thickness of 0.16 mm and a width wider by 6 mm than that of the double layer film was heated by high frequency induction, and the low melting point layers of the films for the inner and outer surfaces of the can body were hot press bonded in such a way that they were brought into contact with the surface of the steel strip when the sheet temperature had reached 175° C., after which the sheet was heated to 205° C. and then quenched. At this time the can outer surface film and the can inner surface film were laminated in such a way that they had the same width and were located, such that both edges thereof are spaced apart by 3 mm inside from the edges of the steel strip, in corresponding positions on the two surfaces of the steel strip.

Then, 250 ml can bodies were produced. The organic laminated steel strip so obtained was cut to form can body blanks and the can body blanks were rolled in such a way that the film surface on which the image of the label of a content had been printed became the outer surface of the can body, and the rolled can body was welded at the overlapping part (i.e., side seam part) of the both edges of the blanks and the weld parts were subjected to repair coating with vinyl chloride—vinyl acetate copolymer based coating, and the repair coating part was dried at 250° C.

The welded can bodies obtained had a good gloss and no color shifting, and moreover, had a better brilliance than existing three-piece cans. Further, a necking-in process and flanged process were carried out, and after fitting a top cover to one end, the can was filled with an accelerated corrosion test liquid which contained 1% citric acid and 0.1% sodium chloride and the can bottom cover was fitted and sealed, and then the can was subjected to a 30 minute retort treatment at 125° C. and the change in the external appearance and adhesion of the film were investigated. No problems were observed and the cans had a performance similar to or better than that of an existing three-piece can.

Example 5

A thermosetting epoxy resin (dry film thickness 5 $\mu$m) was coated at a width corresponding to the can diameter, leaving uncoated parts having a width of 2 mm at both sides, onto one surface of a steel strip of thickness 0.18 mm which had been subjected to a chromate treatment after nickel plating with the attachment of 0.6 g/m$^2$ of Ni. After the heating and hardening were completed, the temperature of the steel strip-was set to 175° C. and the low melting point layer of the same printed multi-layer structure film as used in Example 4 was hot press bonded by bringing it into contact with the surface of the steel strip at corresponding positions on both sides of the steel sheet, after which the sheet was heated to 205° C. and then quenched.

Then 250 ml can bodies were prepared as follows. The organic laminated steel strip so obtained was cut to form can body blanks, which were then rolled in such a way that the film surface having the printed image of the label of the content became the outer surface of the can body, and the rolled can body blanks were welded at the overlapping part of the both edges of the blanks by a resistance seem welding process to thereby obtain the desired 250 ml can body. The inner and outer surfaces of the weld part of the can body were subjected to repair coating with a vinyl chloride-vinyl acetate copolymer based coating, and the repair coating part was dried at 250° C.

The welded can body obtained had a good gloss and no color shifting, and moreover, had a better brilliance than existing three-piece can bodies. Further, a necking-in process and flanged processing were carried out, and after fitting a top cover to one end, the can was filled with an accelerated corrosion testing liquid which contained 1% citric acid and 0.1% sodium chloride and the can bottom cover was fitted and sealed, and then the can was subjected to a 30 minute retort treatment at 125° C. and changes in the external appearance and adhesion of the inner coating and the outer film of the can body were investigated. No problems were observed and the can had a performance similar to or better than that of an existing three-piece can.

Example 6

An image of a label of a content was gravure printed, using a printing ink in which a polyurethane based resin was used for the binder, onto one side of a single layer biaxially extended polyester film (thickness 12 $\mu$m, containing 18 wt % titanium dioxide) and a polyester based clear coating which contained fine Si based particles 2 $\mu$m in diameter was coated over this layer and dried. Then, a urethane based adhesive containing a hardening agent was coated onto the other side of the film and dried, to provide a printed multi-layer structure film.

Further, a biaxially oriented two-layer structure polyester film having a lower layer with a melting point of 190° C. and an upper layer with a melting point of 240° C., and which contained no white pigment (lower layer 3 $\mu$m, upper layer 15 $\mu$m), was prepared as a film for the inner surface of a can body.

A Sn/Ni plated steel sheet with 1.1 g/m$^2$ of Sn and 0.02 g/m$^2$ of Ni attached, and having a thickness of 0.16 mm, and a width wider by 6 mm than that of the above-mentioned both films (chromate treated) was heated by high frequency induction, and the low melting point layer of the film for the inner surface of the can was press bonded in such a way that it was brought into contact with the surface of the steel strip when the strip temperature reached 175° C., after which the strip was heated 205° C. and the urethane based adhesive layer of the printed multi-layer structure film was hot press bonded in such a way that it was brought into contact with the steel strip surface such that both edges thereof are spaced apart by 3 mm inside from the edges of the steel strip at a position corresponding on both surfaces on the other side of the steel strip, and then the strip was quenched.

Then 250 ml can bodies were produced as follows. The organic laminated steel strip so obtained was cut to form can body blanks, which were then rolled in such a way that the film surface having the printed image of the label of the content became the outer surface of the can body, and the rolled can body blanks were welded at the overlapping part of the both edges of the blanks by a resistance seem welding process to thereby obtain the desired 250 ml can body. The inner and outer surfaces of the weld of the can body were subjected to repair coating with a vinyl chloride-vinyl acetate copolymer coating, and the repair coating part was dried at 230° C.

The welded can body thus obtained had a good gloss and no color shifting, and moreover, had a better brilliance than existing three-piece ban bodies. Moreover, a necking-in process and flanged process were carried out, and after fitting a can top cover to one end, the can was filled with tomato juice and the can bottom cover was fitted and sealed, and then the can was subjected to a 30 minute retort treatment at 125° C. and changes in the external appearance and adhesion of the film were investigated. No problems were observed and the can body had a performance similar to or better than that of an existing three-piece can body.

Example 7

A thermosetting polyester coating to which a silicone lubricant had been added was coated to a dry film having a thickness of 2 $\mu$m on a biaxially oriented polyester resin film of thickness of 10 $\mu$m, and an image of a label of a content was gravure printed with a total of five colors comprising 4 colored inks and white ink on the other side of the film, and after drying, a urethane based adhesive was coated to a dry thickness of 2.3 $\mu$m on the printed ink surface and dried.

Further, a double layer plating with deposited amounts on one side of 25 mg/m$^2$ Ni and 1.2 g/m$^2$ Sn was carried out on a cold rolled steel strip of maximum surface roughness before plating Ra 0.28 $\mu$m minimum surface roughness before plating Ra 0.22 $\mu$m, of a sheet thickness of 0.19 mm and a width wider by 6 mm than the width of the above-mentioned film, and after carrying out a heating and melting process, the sheet was subjected to a chromate treatment. The surface roughness after this treatment was a maximum Ra 0.18 $\mu$m, minimum Ra 0.12 $\mu$m, and the gloss was a maximum 580%, minimum 420%.

This Sn/Ni double layer plated steel strip was heated using an induction heating system, and on reaching 200° C., the printed film described above was hot-press bonded via the adhesive layer such that both edges thereof are spaced apart by 3 mm inside from the edges of the steel strip, and an organic laminated steel strip was obtained (Sample 1).

Furthermore, a double layer plating with 50 mg/m$^2$ Ni and 1.5 g/m$^2$ Sn as amounts deposited on one side was carried out on a cold rolled steel strip having a maximum surface roughness before plating of Ra 0.22 $\mu$m, minimum surface roughness before plating Ra 0.18 $\mu$m of a sheet thickness of 0.19 mm, and after carrying out a heating and melting process, the sheet was subjected to a chromate treatment. The surface roughness after plating was a maximum Ra 0.10 $\mu$m, minimum Ra 0.06 $\mu$m, and the gloss was a maximum 680%, minimum 650%.

This Sn/Ni double layer plated steel strip was heated using an induction heating system, and on reaching 200° C., the printed film described above was hot press bonded via the adhesive layer such that both edges thereof are spaced apart by 3 mm inside from the edges of the steel strip, and an organic laminated steel sheet was obtained (Sample 2).

Then 250 ml juice can bodies were manufactured, from the organic laminated steel sheets i.e., Sample 1 and Sample 2, as follows. The organic laminated steel strip so obtained was cut to form can body blanks, which were then rolled in such a way that the film surface having the printed image of the label of the content became the outer surface of the can body, and the rolled can body blanks were welded at the overlapping part of the both edges of the blanks by a resistance seem welding process to thereby obtain the desired 250 ml can body. The inner and outer surfaces of the weld parts of the can body were subjected to repair coating with a thermosetting epoxy based coating and dried at a maximum attained temperature (the local temperature in the repair coating part) of 250° C.

The outer surfaces of the can bodies from both Sample 1 and Sample 2 had a good gloss with no color shifting, and moreover, the brilliance of the design was better than that of an existing three-piece can.

Example 8

An image of a label of a content was gravure printed with four colored inks onto a biaxially oriented polyester resin film of a thickness of 20 $\mu$m and containing 20 wt % titanium oxide white, and after drying, a thermosetting epoxy based coating containing a silicone lubricant was coated to a dry thickness of 7 $\mu$m on the printed ink surface and dried. Next, a urethane based adhesive was coated to a dry thickness of 2.5 $\mu$m on the opposite side to the printed ink layer and dried.

Further, plating with 2.8 g/m$^2$ of tin as the amount deposited on one side was carried out on a cold rolled steel sheet of a maximum surface roughness before plating of Ra 0.35 $\mu$m and a minimum surface roughness before plating of Ra 0.25 $\mu$m of a sheet thickness of 0.20 mm and a width wider by 6 mm than that of the width of the above-mentioned film and after carrying out a heating and melting process, the sheet was subjected to a chromate treatment. The surface roughness after plating was a maximum Ra 0.12 $\mu$m, minimum Ra 0.08 $\mu$m, and the gloss was a maximum 710%, minimum 690%.

This Sn plated steel sheet was heated using an induction heating system, and on reaching 200° C., the printed film described above was hot press bonded via the adhesive layer such that both edges thereof are spaced apart by 3 mm inside from the edges of the steel strip, and an organic laminated steel strip was obtained (Sample 3).

Furthermore, a double layer plating with 27 mg/m$^2$ Ni and 1.5 g/m$^2$ Sn as amounts deposited on one side was carried out on a cold rolled steel sheet of a maximum surface roughness before plating of Ra 0.38 $\mu$m, minimum surface roughness before plating of Ra 0.32 $\mu$m of a sheet thickness of 0.20 mm and having the same width as Sample 3, and after carrying out a heating and melting process, the sheet was subjected to a chromate treatment. The surface roughness after plating was a maximum Ra 0.20 μm, minimum Ra 0.12 μm, and the gloss was a maximum 590%, minimum 453%.

This Sn/Ni double layer plated steel sheet was heated using an induction heating system, and on reaching 200° C., the printed film described above was hot press bonded via the adhesive layer in the same manner as in Sample 3 and an organic laminated steel sheet was obtained (Sample 4).

Then 250 ml juice can bodies were manufactured using the welding method from organic laminated steel strips obtained in Sample 3 and Sample 4, in the same manner as in Sample 1, the inner and outer surfaces of the weld part of the can body were subjected to repair coating with a thermosetting epoxy based coating and dried at a maximum attained temperature (the local temperature in the repair coating part) of 250° C. The outer surfaces of the can bodies from both Sample 3 and Sample 4 had a good gloss with no color shifting, and moreover, the brilliance of the design was better than that of an existing three-piece can.

Example 9

An image of a label of a content was gravure printed with four colored inks onto a biaxially oriented polyester resin film of a thickness of 15 μm containing 12 wt % titanium oxide white, and after drying, a thermosetting epoxy based coating containing a silicone lubricant was coated to a dry thickness of 7 μm on the printed ink surface and dried. Next, a urethane based adhesive was coated to a dry thickness of 1.5 μm on the opposite side to the printed ink layer and dried.

Further, a double layer plating with 780 mg/m² of Ni and 0.65 g/m² of Sn as the amounts deposited on one side was carried out on a cold rolled steel strip of a maximum surface roughness before plating of Ra 0.22 μm and a minimum surface roughness before plating of Ra 0.18 μm of a sheet thickness of 0.18 mm and a width wider by 6 mm than the width of the film, and after carrying out a heating and melting process, the sheet was subjected to a chromate treatment. The surface roughness after plating was a maximum Ra 0.20 μm, minimum Ra 0.12 μm, and the gloss was a maximum 465%, minimum 348%.

This Ni/Sn double layer plated steel sheet was heated using an induction heating system, and on reaching 200° C., the printed film described above was hot press bonded via the adhesive layer as in Sample 1 and an organic laminated steel strip was obtained (Sample 5).

Then, 250 ml juice can bodies were manufactured, in the same steps as in Sample 1, using the welding method from organic laminated steel sheet of Sample 5, in such a way that the organic laminated surface formed the outer surface of the can body, and the weld parts were subjected to repair coating and dried at a maximum attained temperature (the local temperature in the repair coating part) of 250° C. The outer surfaces of the can bodies obtained from Sample 5 had a good gloss with no color shifting, and moreover, the brilliance of the design was better than that of an existing three-piece can.

Example 10

An image of a label of a content was gravure printed with four colored inks onto a biaxially oriented polyester resin film of a thickness of 23 μm containing 35 wt % titanium oxide white, and after drying, a thermosetting epoxy based coating containing a silicone lubricant was coated to a dry thickness of 7 μm on the printed ink surface and dried. Next, a urethane based adhesive was coated to a dry thickness of 3.5 μm on the opposite side to the printed ink layer and dried.

Further, a double layer plating with 15 mg/m² of Ni and 0.87 g/m² of Sn as the amounts deposited on one side was carried out on a cold rolled steel strip of a maximum surface roughness before plating of Ra 0.38 μm and minimum surface roughness before plating of Ra 0.32 μm of a sheet thickness of 0.20 mm and a width wider by 6 mm than that of the film, and after carrying out a heating and melting process, the strip was subjected to a chromate treatment. The surface roughness after plating was a maximum Ra 0.28 μm, minimum Ra 0.21 μm, and the gloss was a maximum 420%, minimum 320%.

This Ni/Sn double layer plated steel strip was heated using an induction heating system, and on reaching 200° C., the printed film described above was hot press bonded via the adhesive layer as in Sample 1 and an organic laminated steel strip was obtained (Sample 6).

Then 250 ml juice can bodies were manufactured, in the same steps as in Sample 1, using the welding method from the organic laminated steel strip of Sample 6, in such a way that the organic laminated surface formed the outer surface of the can body, and the inner and outer surfaces of the weld part of the can body were subjected to repair coating and dried at a maximum attained temperature (the local temperature in the repair coating part) of 250° C. The outer surfaces of the can bodies obtained from Sample 6 had a good gloss with no color shifting, and moreover, the brilliance of the design was better than that of an existing three-piece can.

Example 11

An image of a label of a content was gravure printed with four colored inks onto a biaxially oriented polyester resin film of a thickness of 9 μm containing 7 wt % titanium oxide white, and after drying, a thermosetting epoxy based coating containing a silicone lubricant was coated to a dry thickness of 8 μm on the printed ink surface and dried. Next, a urethane based adhesive was coated to a dry thickness of 2.5 μm on the opposite side to the printed ink surface and dried.

Further, a plating with 1.43 g/m² of Sn as the amount deposited on one side was carried out on a cold rolled steel strip of a maximum surface roughness before plating of Ra 0.28 μm and minimum surface roughness before plating of Ra 0.22 μm of a strip thickness of 0.20 mm, and a width wider by 6 mm than that of the film and after carrying out a heating and melting process, the strip was subjected to a chromate treatment. The surface roughness after plating was a maximum Ra 0.16 μm, minimum Ra 0.09 μm, and the gloss was a maximum 537%, minimum 475%.

This Sn plated steel strip was heated using an induction heating system, and on reaching 200° C., the printed film described above was hot press bonded via the adhesive layer as in Sample 1 and an organic laminated steel strip was obtained (Sample 7).

A thermosetting polyester coating to which a silicone lubricant had been added was coated to a dry thickness of 2 μm on a biaxially oriented polyester resin film of a thickness of 9 μm and then an image of a label of a content was gravure printed with a total of five colors comprising four colored inks and white ink on the other side, and after drying, a polyester based adhesive was coated to a dry thickness of 2.5 μm on the printed ink surface and dried.

The printed film manufactured in this way was hot press bonded via the adhesive layer, as in Sample 1, after heating the above-mentioned Sn plated steel strip with an induction heating system to 200° C., and an organic laminated steel strip was obtained (Sample 8).

Then 250 ml juice can bodies were manufactured, in the same steps as in Sample 1, using the welding method from the organic laminated steel strip of obtained in Sample 7 and Sample 8, in such a way that the organic laminated surfaces formed the outer surfaces of the can bodies, and the inner and outer surfaces of the weld part of the can body were subjected to repair coating with a thermosetting epoxy based coating and dried at a maximum attained temperature (the local temperature in the repair coating part) of 250° C. The outer surfaces of the can bodies obtained from Sample 7 and Sample 8 had a good gloss with no color shifting, and moreover, the brilliance of the design was better than that of an existing three-piece can.

Comparative Example 1

An image of a label of a content was gravure printed with four colored inks onto a biaxially oriented polyester resin film of a thickness of 15 $\mu$m containing 12 wt % titanium oxide white, and after drying, a thermosetting epoxy based coating containing a silicone lubricant was coated to a dry thickness of 7 $\mu$m on the printed ink surface and dried. Next, a urethane based adhesive was coated to a dry thickness of 2.5 $\mu$m on the opposite side to the printed ink surface and dried.

Further, a double layer plating with 25 mg/m$^2$ Ni and 1.78 g/m$^2$ Sn as the amounts deposited on one side was carried out on a cold rolled steel strip of a maximum surface roughness before plating of Ra 0.53 $\mu$m and minimum surface roughness before plating of Ra 0.45 $\mu$m of a sheet thickness of 0.20 mm and a width wider by 6 mm than that of the film, and after carrying out a heating and melting process, the sheet was subjected to a chromate treatment. The surface roughness after plating was a maximum Ra 0.47 $\mu$m, minimum Ra 0.41 $\mu$m, and the gloss was a maximum 270%, minimum 148%.

This Ni/Sn double layer plated steel sheet was heated using an induction heating system, and on reaching 200° C., the printed film described above was hot press bonded via the adhesive layer, as in Sample 1, and an organic laminated steel strip was obtained (Comparative Sample 1).

Then 250 ml juice can bodies were manufactured, in the same step as in Sample 1, using the welding method from the organic laminated steel strip obtained in Comparative Sample 1, in such a way that the organic laminated surface formed the outer surface of the can bodies, and the inner and outer surfaces of the weld part of the can body were subjected to repair coating with a thermosetting epoxy based coating and dried at a maximum attained temperature (the local temperature in the repair coating part) of 250° C. The outer surfaces of the can bodies obtained from Comparative Sample 1 had a good gloss with no color shifting, but had a dark coloration and the brilliance of the design was worse than that of an existing three-piece can.

Comparative Example 2

A thermosetting polyester coating to which silicone lubricant had been added was coated to a dry thickness of 2 $\mu$m on a biaxially oriented polyester resin film of a thickness of 15 $\mu$m, and then an image of a label of a content was gravure printed with a total of five colors comprising four colored inks and white ink on the other side, and after drying, a urethane based adhesive was coated to a dry thickness of 2.1 $\mu$m on the printed ink surface and dried.

The printed film manufactured in this way was hot press bonded via the adhesive layer, as in Sample 1, onto the Ni/Sn double layer plated steel strip used in Comparative Example 1, which had been heated using an induction heating system to 200° C., and an organic laminated steel strip was obtained (Comparative Sample 2).

Then 250 ml juice can bodies were manufactured, in the same steps as in Sample 1, using the welding method from the organic laminated steel strip obtained in Comparative Sample 2, in such a way that the organic laminated surface formed the outer surface of the can bodies, and the inner and outer surfaces of the weld part of the can body were subjected to repair coating with a thermosetting epoxy based coating and dried at a maximum attained temperature (the local temperature in the repair coating part) of 250° C. The outer surfaces of the can bodies obtained from Comparative Sample 2 had a good gloss with no color shifting, but had a dark coloration and the brilliance of the design was worse than that of an existing three-piece can.

Comparative Example 3

An image of a label of a content was gravure printed with four colored inks onto a biaxially oriented polyester resin film of a thickness of 20 $\mu$m containing 20 wt % titanium oxide white, and after drying, a thermosetting epoxy based coating containing a silicone lubricant was coated to a dry thickness of 8 $\mu$m on the printed ink surface and dried. Next, a urethane based adhesive was coated to a dry thickness of 2.5 $\mu$m on the opposite side to the printed ink surface and dried.

Further, a tin plating with 0.35 g/m$^2$ Sn as the amount deposited on one side was carried out on a cold rolled steel strip of a maximum surface roughness before plating of Ra 0.35 $\mu$m and minimum surface roughness before plating of Ra 0.25 $\mu$m of a sheet thickness of 0.20 mm and a width wider by 6 mm than that of the film, and after carrying out a heating and melting process, the strip was subjected to a chromate treatment. The surface roughness after plating was a maximum Ra 0.31 $\mu$m, minimum Ra 0.23 $\mu$m, and the gloss was a maximum 210%, minimum 125%.

This Sn plated steel strip was heated using an induction heating system, and on reaching 200° C., the printed film described above was hot press bonded via the adhesive layer, as in Sample 1, and an organic laminated steel strip was obtained (Comparative Sample 3).

Then 250 ml juice can bodies were manufactured, in the same steps as in Sample 1, using the welding method from the organic laminated steel strip obtained in Comparative Sample 3, in such a way that the organic laminated surface formed the outer surface of the can bodies, and the inner and outer surfaces of the weld part of the can body were subjected to repair coating with a thermosetting epoxy based coating and dried at a maximum attained temperature (the local temperature in the repair coating part) of 250° C. The outer surfaces of the can bodies obtained from Comparative Sample 3 had a good gloss with no color shifting, but had a dark coloration and the brilliance of the design was worse than that of an existing three-piece can.

Example 12

A roll of a 16 $\mu$m thick and 984 mm wide four layer organic resin film having a structure of a thermosetting adhesive layer/a printed ink layer/a saturated polyester resin layer/a layer of a thermosetting epoxy coating containing silicon as a lubricant was manufactured, in preparation, and the printed ink layer of the film was provided by a gravure printer to represent repetitive images of a label of a product in six stripes, each extending along the length direction of the film at a width of 159.8 mm and being spaced from one another by 4 mm, such that the six stripes were centered in the width of the film with a print free portion 2.6 mm in width provided on each edge of the film.

Then, a 0.17 mm thick and 985 mm wide coiled steel strip plated with 1.2 g/m² of tin and covered thereon with 8 mg/m² of metallic chrome and then with 7 mg/m² (metallic chromium equivalent) of hydrated chromium oxide was unwound and dispensed at a predetermined speed from an uncoiler, and coated continuously, on one side with a thermosetting epoxy based coating at a dry film weight of 50 mg/m² in six stripes, each extending along the length direction of the strip at a width of 159.8 mm and being spaced from one another by 4 mm, and on the other side, with a thermosetting polyester based coating containing a white pigment of titanium oxide (a white coating) at a dry film weight of 120 mg/m² in six stripes, each extending along the length direction of the strip at a width of 159.8 mm and being spaced from one another by 4 mm, such that the six stripes of the respective coatings were centered in the width of the steel strip in a back to back alignment with each other on the respective sides thereof.

The coated strip was then heated to a maximum of 270° C. for 20 seconds to cure the coatings, and subsequently, the strip was passed through a pair of cooling rolls and rapidly cooled to 200° C., and then fed to a lamination unit.

On the other hand, the rolled four layer organic resin film was unwound and dispensed into the lamination unit at a speed synchronized with the running speed of the strip being dispensed, such that the adhesive layer of the film faced the white coated side of the strip, and on the way to but just before the lamination unit, the film was slitted by a cutter assembly having a series of sharp blades into the six stripes of the printed portions and the print free portions therebetween, and at both edges of the film.

Then, the print free portions of the film were sucked continuously into a vacuum suction device provided in the vicinity of the cutter assembly and the printed portions were bonded to the strip, such that these printed portions completely covered the six stripes of the white coating to the width of 159.8 mm white maintaining precise 4 mm wide spaces between each adjacent strip of the printed portions.

The series of operations in this example took place using a continuous processing line run at a speed of 200 m per minute, and the completely laminated steel strip obtained was slitted into can body blanks of a size of 163.8 mm by 136.2 mm in such a manner that each such blank had an image of the label of the product with a print free space equally provided at each edge thereof. The slitted body blanks were used successfully in making satisfactory welded can bodies with the images of the label thereon, by a resistance seam welding bodymaker.

Example 13

A thin steel strip of a thickness of 0.18 mm and a width of 985 mm which had 0.58 g/m² of plated nickel and 7 mg/m² (as Cr) of hydrated chrome oxide over the nickel plate on the surface was heated by high frequency heating to 180° C. and sent to a press bonding roll. On the other hand, six stripes of the steel strip laminating part of a width of 163.8 mm were cut with cut-away and removed parts of a width of 4 mm from a transparent polyester film of a width of 983 mm which had been biaxially oriented and which had a low melting point adhesive layer on one side, and these were supplied to the above-mentioned press bonding roll and laminated onto the steel strip surface while maintaining the 4 mm spacing, such that the six stripes of the respective coatings were centered in the width of the steel strip in a back to back alignment with each other on the respective sides as in Example 12. The lamination free parts of a width of 4 mm were sucked into a vacuum suction port which was established in the vicinity of the cutting site and removed from the system continuously in the same way as in Example 12. Subsequently, the steel strip was reheated and sent to a second press bonding roll at 200° C. At the second press bonding roll, a printed film comprised of four layers, namely low melting point adhesive layer/biaxially oriented polyester layer (containing 20 wt % white pigment)/printed ink layer/a thermosetting epoxy coating containing a silicone lubricant was cut to provide printed parts of a width of 159.8 mm and unprinted parts of a width of 4.0 mm immediately before the laminating roll and the printed parts of a width of 159.8 mm were laminated onto the opposite side from that on which the clear polyester film had been laminated already with a positional relationship which corresponded on both sides while maintaining the spacing (4.0 mm) at the time of cutting.

The steel strip having a stripe-like laminated film on both sides, which had been produced in this way, was quenched after being heated to a temperature of 210° C.

The product was cut into blanks of 165.8×136.2 mm which had an unlaminated part of a width of 2 mm at each end and formed into welded can bodies of a can diameter of 52.6 mm and a can height (before fitting the covers) of 136.2 mm in the same way as in Example 12.

Example 14

Nickel plating (25 mg/M²) and the tin plating (10.8 g/m²) were carried out on the surface of a steel strip of a thickness of 0.17 mm and a width of 822 mm, and after heating and melting the tin layer, 12 mg/m² of metallic chromium and 8 mg/m² (as Cr) of hydrated chrome oxide with a chromate treatment was provided over the plated tin. A thermosetting epoxy resin was coated in the form of stripes of a width of 200.6 mm (uncoated parts of a width of 4.0 mm) on one surface of this plated steel strip. The steel strip was heated with a heating time of about 16 seconds to a highest attained temperature of 280° C. and baked, and after cooling to 180° C. on a cooling roll, was sent to a press bonding roll.

At the same time, a printed film comprised of four layers, i.e., low melting point adhesive layer/biaxially oriented polyester layer (which contained 20 wt % white pigment)/printed ink layer/thermosetting epoxy coating layer containing a silicone lubricant was cut into printed parts of a width of 200.6 mm and unprinted parts of a width of 4.0 mm immediately before the laminating roll and the printed parts were laminated onto the opposite surface to that on which the epoxy resin film surface had been coated already, with a positional relationship corresponding on both sides, while maintaining the spacing (4.0 mm) at the time of cutting, in the same manner as in Example 12.

The product was cut to a size of 204.6×125.0 mm and formed into welded can bodies of a can diameter of 65.0 mm and a can height (before fitting the covers) of 125.0 mm.

Example 15

A thermosetting epoxy resin was coated in the form of five continuous bands (stripes) in an amount of 50 mg/m² with a coated part of a width of 162.0 mm and an uncoated part of 3.8 mm at both sides on one side of a thin steel strip of a thickness of 0.15 mm and a width of 832 mm which had 1.2 g/m² of plated tin and 8 mg/m² of metallic chromium and 7 mg/m² (as Cr) of hydrated chrome oxide on its surface.

The spaces between both edges of the strip and, the edges of the left and right end coated portions were 3.4 mm, respectively. Next, a thermosetting polyester resin which contained a titanium oxide based white pigment was coated onto the other surface in an amount of 120 mg/m$^2$ in the form of continuous bands with a positional relationship corresponding to the epoxy resin, after which the strip was heated and the resin layers on both sides were hardened with a heating time of about 20 seconds.

The steel strip, which had been heated up to 270° C. as the highest temperature attained, was rapidly cooled to 200° C. through two cooling rolls and a multi-layer structure film of total thickness of 16 μm comprising thermosetting type adhesive/printed ink/saturated polyester resin/thermosetting epoxy coating layer containing a silicone lubricant was thermally bonded in the same manner as in Example 12. At this time, the width of the coated portions of the multi-layer structure film used was 162.0 mm, the same width as that of the thermosetting polyester resin layer containing a white pigment, and it was bonded directly on top. These operations were carried out continuously on the same line at a line speed of 200 mpm.

The product, which had been taken up as a coil, was cut to the blank dimensions of 165.8 mm (corresponding to a 52.6 mm can of diameter) and 136.2 mm (corresponding to the can height) which had an uncoated part of 1.9 mm at both ends and used on a welded can line in such a way that the multi-layer structure film bonded surface became the outer surface of the can body.

Example 16

A thermosetting epoxy resin was coated in the form of five continuous bands (stripes) in an amount of 50 mg/m$^2$ with a coated part of a width of 162.0 mm, establishing uncoated part of 3.8 mm at both sides on one side of a thin steel strip of a thickness of 0.18 mm and a width of 832 mm which had 0.58 g/m$^2$ of plated nickel and 7 mg/m$^2$ (as Cr) of hydrated chrome oxide over the nickel plate on the surface. The spaces between both edges of the strip and the edges of the left and right end coated portions were 3.4 mm, respectively. The strip was heated to a highest attained temperature of 270° C. over a period of 20 seconds without coating on the other side and was then cooled rapidly to 160° C. through two cooling rolls.

A film which had a three-layer structure comprising saturated polyester resin which contained white pigment (this had a low melting point adhesive layer)/printed ink/a thermosetting epoxy coating layer containing a silicon lubricant was slit into the five films and laminated on the uncoated surface at 160° C. and a precise lamination operation was used so that it was located in the same position as the five stripe epoxy resin coatings which had been coated already on the other side. After lamination at 160° C., the sheet was reheated to 200° C. to increase the strength of adhesion, and then was water cooled and dried and taken up in the form of a coil.

This product was cut to a size of 165.8 mm×136.2 mm in the same way as in Example 16 and welded cans of a can diameter of 52.6 mm and a can height (before fitting the covers) of 136.2 mm were formed.

Example 17

Using the same materials and coating system as in Example 16, a five stripe-like coating was carried out on both sides of the steel strip. This steel strip was heated to a highest attained temperature of 200° C. at a heating time of about 13 seconds and a three layer structure film of a total thickness of 14 μm comprising a saturated polyester resin/printed ink/thermosetting epoxy coating layer containing a silicon lubricant was laminated at this temperature on the side corresponding to the outer surface of the can body. The lamination was carried out in such a manner that the film was slit into five stripe films having a width of 162.0 mm and each of these films are right over the stripe-like coatings. After film lamination, the sheet was re-heated to a highest attained temperature of 270° C., to thereby completely cure the thermoset resin layer, and then cooled.

This product was cut to a size of 165.8 mm×136.2 mm in the same way as in Example 15 and welded can bodies of a can diameter of 52.6 mm and a can height (before fitting the covers) of 136.2 mm were formed.

Example 18

A thermosetting epoxy resin was coated in the form of six continuous bands (stripes) in an amount of 50 mg/m$^2$ with a coating width of 159.8 mm and uncoated parts of 4.0 mm at either end on one side of a thin steel strip having a thickness of 0.17 mm and a width of 985 mm and 1.2 g/m$^2$ of plated tin attached and 8 mg/m$^2$ of metallic chromium and 7 mg/m$^2$ (as Cr) of hydrated chrome oxide over the tin plating, as in Example 12. The spaces between both edges of the strip and the edges of the left and right end coated portions were 3.1 mm, respectively. Next, a thermosetting polyester resin containing a titanium oxide based white pigment was coated onto the other surface in an amount of 120 mg/m$^2$ in the form of continuous bands of the same width with a positional relationship corresponding to the epoxy resin, after which the steel strip was heated and the resin layers on both sides were hardened with a heating time of about 20 seconds.

The steel strip, which had been heated up to 270° C. as the highest temperature attained, was rapidly cooled to 200° C. through two cooling rolls.

A multi-layer film (thickness 16 μm) having a total width of 984 mm and six printed part stripes having a width of 159.8 mm with unprinted parts having a width of 4.0 mm on both sides consisting of four layers, i.e., a thermoset type adhesive/printed ink/saturated polyester resin/thermosetting epoxy coating layer containing a silicone lubricant, was unrolled at the same speed as the steel strip running speed and laminated onto the surface of the steel strip is such a way that the printed parts of a width of 159.8 mm (6 stripes) were superimposed over a thermosetting polyester resin containing titanium based white pigment which had been coated beforehand (6 stripes). The spaces between both edges of the strip and the edges of the left and right end coated portions were 2.6 mm, respectively. The steel strip, which was at 200° C. at the time of lamination, was cooled to normal temperature by water cooling and the adhesive layer was fixed.

Subsequently, cuts reaching to the base were made by sharp rotating blades on both sides of the printed parts present on the film, and the leading edges of the unprinted parts were peeled away under tension with a pinch roll and removed from the system continuously by suction into a vacuum suction port established in the vicinity of the roll, and thus uncoated parts with no printing and a width of 4.0 mm and 3.1 mm were formed. These operations were carried out continuously, peeling away seven strips in the width direction simultaneously, at a line speed of 200 mpm, and six printed part stripes appeared across the width direction. The product, which was taken up in the form of a coil, was cut into can body blanks (163.8×136.2 mm size) corresponding to a 52.6 mm can diameter which had uncoated and unlaminated parts of 2.0 mm at each end on a separately established cutting line and used with no difficulty at all on a welded can line with the multi-layer film bonded surface as the outer surface of the can bodies.

Example 19

A thermosetting epoxy resin was coated in the form of four stripes of a width of 200.6 mm (uncoated part provided between the coated parts of 4.0 mm) on one side of a thin steel strip of a thickness of 0.18 mm and a width of 822 mm, which had 0.58 g/m$^2$ of plated nickel and 7 mg\m$^2$ (as Cr) of hydrated chrome oxide over the nickel plate on the surface. The space between the left end edge of the strip and the edge of the left end coated portion was 3.7 mm and the space between the right end edge of the strip and the edge of the right end coated portion was 3.1 mm. The steel strip was heated to a highest attained temperature of 280° C. with a heating time of about 16 seconds and baked, and after cooling to 180° C. on a cold roll, was sent to a press bonding roll.

A film of a width of 820 mm comprised of four layers, namely a low melting point adhesive layer/biaxially oriented polyester layer (containing 20 wt % white pigment)/printed ink layer/thermosetting epoxy coating layer containing a silicone lubricant, which had four printed parts of a width of 200.6 mm and unprinted parts between the printed parts of a width of 4.0 mm and both the unprinted parts of a width of 3.0 mm in each end portion of the strip and which had perforations for cutting the two parts, was laminated with a corresponding positional relationship on the two surfaces on the other side from that on which the epoxy resin surfaces had been coated beforehand.

Subsequently, in the same way as in Example 19, cuts which did not reach to the base were made with sharp rotating blades at the edges (over the perforations) of the printed parts present on the film, the leading edges of the unprinted parts were peeled away under tension with a pinch roll and removed from the system continuously by suction into a vacuum suction port established in the vicinity of the roll, and in this way, uncoated parts, with no printing, of a width of 4.0 mm and 3.7 mm were formed. These operations were carried out continuously, peeling away five strips in the width direction simultaneously, at a line speed of 200 mpm, and four printed stripes appeared across the width direction.

The product was cut to a size of 204.6×125.0 mm and welded cans of a diameter of 65.0 mm height (before fitting the covers) of 125.0 mm were formed.

Example 20

Thin steel strip of a thickness of 0.18 mm and width of 985 mm, which had a 0.58 g/m$^2$ nickel plating on the surface and a 7 mg/m$^2$ (as Cr) of hydrated chrome oxide film over the nickel plating, was heated to 180° C. by high frequency heating and sent to a press bonding roll. On the other hand, a transparent biaxially oriented polyester film of a width of 983 mm, which had a low melting point adhesive layer in the form of stripes on one side (having steel strip laminated parts of a width of 159.8 mm and cut-away and remove parts of a width of 4 mm located between the laminated parts) was laminated onto the steel strip surface, in the manner as in Example 12. The both sides of the laminated parts of the strip were cut in the prescribed positions in the same way as in Example 18, and after peeling the unwanted parts having a width of 4.0 mm and 2.6 mm, the steel strip was heated again and supplied to a second press bonding roll at 200° C. At the second press bonding roll, a printed film having a width of 983 mm comprised of four layers, i.e., a low melting point adhesive layer/biaxially extended polyester layer (containing 20 wt % white pigment)/printed ink layer/ thermosetting epoxy coating containing a silicone lubricant, (having printed parts of a width of 159.8 mm and unprinted parts between the printed parts of a width of 4.0 mm) was laminated with a corresponding positional relationship on both sides on the other side from the transparent polyester skin film surface which had been laminated. After cooling, the unprinted parts of a width of 4 mm and 2.6 mm were peeled away and removed using the same method as in Example 18.

The steel strip, which had stripe-like laminated skin films on both sides and which had been manufactured in this way, was cut into can body blanks of 163.8×136.2 mm which had unlaminated parts of a width of 2 mm at both ends in the same way as in Example 18, and welded can bodies of a diameter of 52.6 mm and height (before fitting the covers) of 136.2 mm were formed with the printed film laminated surface as the outer surface of the can body.

Example 21

A gravure printing indicating an image of a label of a content was carried out on a 12 μm biaxially oriented polyester film (which contained a 1.5 μm low temperature adhesive layer) which contained 20 wt % of titanium oxide based white pigment, and a polyester based lubricating film which contained Si based fine particles was coated to 2 μm over this layer and dried.

A steel strip which had been subjected to a chromate treatment after Sn/Ni plating with 1.0 g/m$^2$ of Sn and 0.3 g/m$^2$ of Ni on a sheet of thickness 0.20 mm was heated to 200° C. and the above-mentioned film was laminated on the surface corresponding to the outer surface of the can body. Next, a transparent biaxially oriented polyester film of thickness 16 μm which had a 2 μm low temperature adhesive layer was press bonded at 185° C. onto the surface of this steel strip corresponding to the inner surface of the can and a steel strip which was laminated with film on both sides was obtained, in the same way as in Example 12.

A 250 ml juice can body was prepared by welding from the organic laminated steel strip, which had a multi-layer structure, obtained in this way so that the printed film laminated surface became the outer surface of the can body, the weld part was subjected to repair coating and then dried at 250° C. The can body obtained developed no less of gloss or color shifting at any stage and had a better brilliance than the existing three-piece cans.

Example 22

A 25 μm modified polypropylene oriented film was laminated with the hot press bonding method onto the surface corresponding to the inner surface of the can of a steel strip (sheet thickness 0.15 mm) which had been subjected to a chromate treatment after Ni plating with 0.6 g/m$^2$ of nickel, and a 25 μm modified polypropylene oriented film containing white pigment and which had been subjected to printing and had a lubricating film (i.e., a thermosetting epoxy coating layer containing a silicone lubricant), was laminated with the hot press bonding method onto the can outer surface side.

A 250 ml juice can body was manufactured by welding from the multi-layer structure organic film steel strip obtained in such a way that the printed film surface became the outer surface, and the weld part was subjected to repair coating and dried at 140° C. The outer can surface obtained in this way had no reduction in gloss or color shifting, and the brilliance was no worse than an existing outer surface printed three-piece can body.

Example 23

A thermosetting epoxy resin was coated in an amount of 10 mg/m$^2$ on the surface of the same steel strip as in Example 21 and dried. Subsequently, the same films as in Example 21 were laminated in the same order onto the two surfaces of the steel strip. At this time, the 16 μm thick transparent biaxially oriented polyester film was laminated on the epoxy resin coated surface in such a way that it became the inner surface of the can body.

A 250 ml juice can body was manufactured by welding from the organic laminated steel strip which had a multi-layer structure obtained in such a way that the printed film laminated surface became the outer surface, and the weld part was subjected to repair coating and then dried at 250° C. The can body obtained produced no reduction in gloss or color shifting at any stage, and the brilliance was better than that of an existing three-piece can body.

Example 24

A thermosetting polyester resin which contained white pigment was coated to 12 μm onto the surface corresponding to the outer surface of a can body of a steel strip (sheet thickness 0.15 mm) which had been subjected to a chromate treatment after Ni plating with 0.6 g/m$^2$ of nickel, and dried. A film formed by coating 1 μm of a polyester based coating to which Si based fine particles had been added as a lubricating film on a 12 μm biaxially oriented polyester film and drying and then gravure printing an image of a label of a content on the other side and providing a urethane based adhesive of thickness 4 μm over the top of this was hot press bonded at 205° C. onto the above-mentioned thermosetting polyester resin surface which contained the white pigment. A biaxially oriented polyester film of thickness 20 μm (which had a 2 μm low temperature adhesive layer) was hot press bonded at 195° C. onto the surface corresponding to the inner surface of the can body, heated to 210° C., and quenched.

A 250 ml juice can body was manufactured by welding from the organic laminated steel strip which had a multi-layer structure obtained in such a way that the printed film laminated surface became the outer surface, the weld part was subjected to repair coating and then dried at 250° C. The can body obtained produced no reduction in gloss or color shifting at any stage, and the brilliance was better than that of an existing three-piece can body.

Examples 25

A thermosetting polyester coating containing a silicone lubricant was coated to 2 μm on a 10 μm biaxially oriented polyester film and dried, after which a four-color image of a label of a content was gravure printed on the other side and 1.5 μm urethane based adhesive was coated over the printed ink and dried. The total thickness of the printed film thus manufactured was 16 μm. On the other hand, an epoxy ester based coating containing white pigment was coated to 5 μm on a steel strip of a thickness of 0.16 mm, which had been subjected to a chromate treatment after Sn/Ni plating with 1.0 g/m$^2$ of Sn and 0.3 g/m$^2$ of Ni, and when heated to 200° C. by induction heating, the above-mentioned printed film was hot press bonded onto the steel sheet (Sample 9).

A printed film of the same specification as described above was laminated at 200° C. onto a steel strip having a 13 μm epoxy ester based coating film containing white pigment (Sample 10).

With these prototype laminated steel strips, no problem with the crystal orientation of the biaxially oriented polyester film occurred, and both had the structure intended by the present invention.

Juice can bodies (250 ml) were manufactured by welding from the organic laminated steel strips having a multi-layer structure obtained in Samples 9 and 10, in such a way that the multi-layer structure organic film surfaces formed the outer surface of the can bodies, the weld parts were subjected to repair coating, and the can bodies were dried at a maximum attained temperature (local temperature of the repair coating part) of 250° C.

The can bodies obtained from Sample 9 and Sample 10 had a good gloss with no color shifting, and were better in terms of brilliance than existing three-piece cans.

Example 26

A thermosetting polyester coating containing a silicone lubricant was coated to 1.5 μm on a 9 μm biaxially oriented polyester film and dried, after which a six-color image of a label of a content was gravure printed onto the other side and 2.0 μm of urethan based adhesive was coated over the printed ink and dried. The total thickness of the printed film manufactured in this way was 15.5 μm. An epoxy based coating film, which did not contain white pigment, was coated to 6 μm on the same plated steel strip as in Example 25 and dried, and the above-mentioned film was laminated thereover at 195° C. (Sample 11).

The same film was laminated directly at 195° C. without the base coating onto the same plated steel strip as in Example 24 (Sample 12).

On analyzing the polyester resin film structure of the prototype Sample 11 and prototype Sample 12 there was no problem with the crystal orientation of the biaxially oriented polyester film, and the samples had a structure as intended in the present invention.

A 250 ml juice can bodies were produced as follows. The organic laminated steel strip so obtained was cut to form can body blanks, which were then rolled in such a way that the film surface having the printed image of the label of the content became the outer surface of the can body, and the rolled can body blanks were welded at the overlapping part of the both edges of the blanks by a resistance seam welding process to thereby obtain the desired 250 ml can body. The inner and outer surfaces of the weld part of the can body were subjected to repair coating and dried with a maximum temperature of 230° C. The can bodies obtained had a good gloss with no color shifting, and the brilliance was better than that of conventional can bodies.

Example 27

An epoxy ester based coating containing white pigment was coated (8 μm) onto a steel strip which had been subjected to a chromate treatment after Ni plating 0.6 g/m$^2$ of nickel onto a steel strip of thickness 0.15 mm and heated and dried, and then cooled to 80° C.

Further, 1 μm of thermosetting polyester coating containing a silicone lubricant was coated onto a 12 μm biaxially oriented polyester film and dried, after which a five-color image of a label of a content was gravure printed onto the other side and 1.8 μm of an urethane based adhesive was solution coated onto the surface of the film, and this was laminated onto the surface of the steel strip in a condition such that the solvent had evaporated and the material was tacky (Sample 13).

Juice can bodies (250 ml) were manufactured by welding from the multi-layer structure organic film steel strip obtained in such a way that the multi-layer structure organic film surface was the outer surface of the can body, and the weld parts were subjected to repair coating and dried in such a way that the highest temperature was 250° C. The can bodies obtained from Sample 13 had a good gloss with no color shifting, and the brilliance was better than that of existing cans.

We claim:

1. A resistance seam welded three-piece can body having, laminated on its outer surface, a multiple layer outer surface organic film of a structure of (1) an organic coating layer/an adhesive layer having a thickness of 1 to 5 μm/a printing ink layer/a thermoplastic resin layer/a clear thermosetting resin coating layer containing a lubricant having a thickness of 0.1 to 5 μm or (2) an adhesive layer/a printing ink layer/a thermoplastic resin layer/a clear thermosetting resin coating layer containing a lubricant having a thickness of 0.1 to 5 μm, all being arranged one on top of another in said order on said outer surface of the can body, said multiple layer outer surface organic film having a thickness of 5–25 μm and a width less than the circumferential width of the can body, and having, laminated on its inner surface and in alignment with the outer surface organic film, an inner surface film having a structure of (1) a thermosetting organic coating layer, (2) an adhesive layer having a thickness of 1 to 5 μm/thermoplastic resin layer being arranged one on top of the other in said order on said inner surface, or (3) a thermoplastic resin layer, said inner and outer surface films having a melting point temperature higher than baking temperature for repair coating, said inner surface film having a water uptake of 1% or less, and said inner surface film having a thickness of 5 to 50 μm, said printing ink layer of said multiple layer outer surface organic film being a gravure printing layer and a resistance welded seam having a width of 0.5 to 5 mm prior to resistance welding of said can body being free from coverage by said multiple layer outer surface organic film or said inner surface film.

2. A resistance seam welded three-piece can body as set forth in claim 1, wherein the inner surface of the can body carries a thermoplastic resin layer formed to a thickness of 5 to 50 μm by a polypropylene resin, a nylon resin or a polyester resin.

3. A resistance seam welded three-piece can body as set forth in claim 2, wherein the inner surface of the can body carries a thermoplastic resin layer formed by two layers of saturated polyester resins, one being in direct contact with said surface (a lower layer) and the other being laid down over the lower layer (an upper layer) and having a melting point higher by at least 10° C. than that of the lower layer, and the upper layer or both upper and lower layers being biaxially oriented saturated polyester resins.

4. A resistance seam welded three-piece can body as set forth in claim 1, wherein said thermoplastic resin layer on the outer surface of the can body is formed by a biaxially oriented saturated polyester resin.

* * * * *

UNITED STATES PATENT AND TRADEMARK OFFICE
CERTIFICATE OF CORRECTION

PATENT NO. : 5,820,954
DATED : October 13, 1998
INVENTOR(S) : Yashichi ooyagi, et al.

It is certified that error appears in the above-identified patent and that said Letters Patent is hereby corrected as shown below:

Column 32, line 10, delete "resistance welded".

Signed and Sealed this

Twenty-eighth Day of November, 2000

Attest:

Q. TODD DICKINSON

*Attesting Officer*  *Director of Patents and Trademarks*